United States Patent
Mostofizadeh et al.

(10) Patent No.: US 10,814,783 B1
(45) Date of Patent: Oct. 27, 2020

(54) VEHICLE SAFETY CHECK SYSTEM

(71) Applicant: HONDA MOTOR CO., LTD., Tokyo (JP)

(72) Inventors: Susan L. Mostofizadeh, Dublin, OH (US); William C. Lanz, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/579,406

(22) Filed: Sep. 23, 2019

(51) Int. Cl.
  *B60R 22/48* (2006.01)
  *B60Q 9/00* (2006.01)
  *G07C 5/08* (2006.01)

(52) U.S. Cl.
  CPC ............. *B60Q 9/00* (2013.01); *G07C 5/085* (2013.01); *G07C 5/0825* (2013.01)

(58) Field of Classification Search
  None
  See application file for complete search history.

(56) References Cited

U.S. PATENT DOCUMENTS

| | | | |
|---|---|---|---|
| 6,362,734 B1* | 3/2002 | McQuade | B60R 22/48 180/267 |
| 6,734,651 B2 | 5/2004 | Cook et al. | |
| 6,937,142 B2 | 8/2005 | Theiss et al. | |
| 7,434,650 B2 | 10/2008 | Hofbeck et al. | |
| 8,164,300 B2 | 4/2012 | Agassi et al. | |
| 9,522,631 B2 | 12/2016 | Kleinert et al. | |
| 10,549,717 B2* | 2/2020 | Koase | B60R 22/48 |
| 2013/0030645 A1 | 1/2013 | Divine et al. | |
| 2014/0309864 A1 | 10/2014 | Ricci | |
| 2018/0345903 A1* | 12/2018 | Ishibashi | B60R 22/48 |

OTHER PUBLICATIONS

Eyesight Technologies., "Eyesight Technologies Creates CabinSense™—A Smart Car Cabin Software, Which Makes Cars Better Understand Their Occupants", Feb. 14, 2019, 4 Pages Total, Copyright © 2019 PR Newswire Association LLC. All Rights Reserved. A Cision company.

* cited by examiner

*Primary Examiner* — Brent Swarthout
(74) *Attorney, Agent, or Firm* — Arent Fox LLP (57) ABSTRACT

A system and method of implementing reminders include receiving occupant information associated with one or more occupants in the vehicle, receiving safety data associated with the one or more occupants, generating a safety profile for each of the one or more occupants, and determining if each of the safety profiles meets requirements of one or more safety standards.

17 Claims, 8 Drawing Sheets

VEHICLE SAFETY CHECK SYSTEM

TECHNICAL FIELD

The present disclosure relates to a vehicle safety check system.

BACKGROUND

Vehicle safety devices and systems are essential in reducing injury to vehicle occupants during a collision or accident. As technology progresses, many advanced vehicle safety devices may increase safety of occupants during a collision or accident. For example, frontal and curtain airbags may cushion the impact of a collision between the occupants and other objects in the vehicle. A child booster seat may increase the seated height of a child in a vehicle so the child may be properly restrained by the seat belt. An infant car seat may provide additional padding to an infant while simultaneously positioning the infant in a safe position (e.g., rear-facing inclined position to reduce injury to the infant's neck during an accident). However, vehicle safety devices and systems work the best when used properly, and many occupants may not use the vehicle safety devices properly. Therefore, improvements are desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include a method of implementing reminders including receiving occupant information associated with one or more occupants in the vehicle, receiving safety data associated with the one or more occupants, generating a safety profile for each of the one or more occupants, and determining if each of the safety profiles meets requirements of one or more safety standards.

One aspect of the present disclosure includes an infotainment system having a processor and a memory having instructions stored therein that, when executed by the processor, cause the processor to perform the steps of receiving occupant information associated with one or more occupants in the vehicle, receiving safety data associated with the one or more occupants, generating a safety profile for each of the one or more occupants, and determining if each of the safety profiles meets requirements of one or more safety standards.

In some aspects of the present disclosure, a non-transitory computer readable medium includes computer-executable instructions that, when executed by a processor of an infotainment system of a vehicle, cause the processor to perform the steps receiving occupant information associated with one or more occupants in the vehicle, receiving safety data associated with the one or more occupants, generating a safety profile for each of the one or more occupants, and determining if each of the safety profiles meets requirements of one or more safety standards.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, boats, personal watercraft, and aircraft. In some cases, a motor vehicle includes one or more engines.

An aspect of the present disclosure may include a safety program that executes through the infotainment interface in a vehicle. The program may track the number of occupants in the vehicle and the ages of the occupants. The program may execute to evaluate each seating position to ensure that the occupant is following government regulations (e.g., being buckled when they should be, type of child restraint based on age/weight/height, etc.). The program may relay the recommendations set by different organizations, such as the American Academy of Pediatrics, for whether a child should be rear-facing, forward-facing, or in a booster seat. The program may check the installation of the child restraint system after confirming with the driver via the infotainment system how and which type of restraint is installed if there is a child in the vehicle. For vehicles equipped with navigation systems, the program may monitor if the vehicle has crossed or intends to cross (e.g., based on route set by the driver through the Global Positioning System (GPS)) a border or boundary between jurisdictions (e.g., states, provinces, cities) having different safety laws and regulations. The program may notify the driver of any changes in the safety laws and regulations when the vehicle crosses the border/boundary. If the destination is programmed via the navigation system, the notification may be provided prior to departure so the driver may take appropriate action if necessary.

Figure 1:
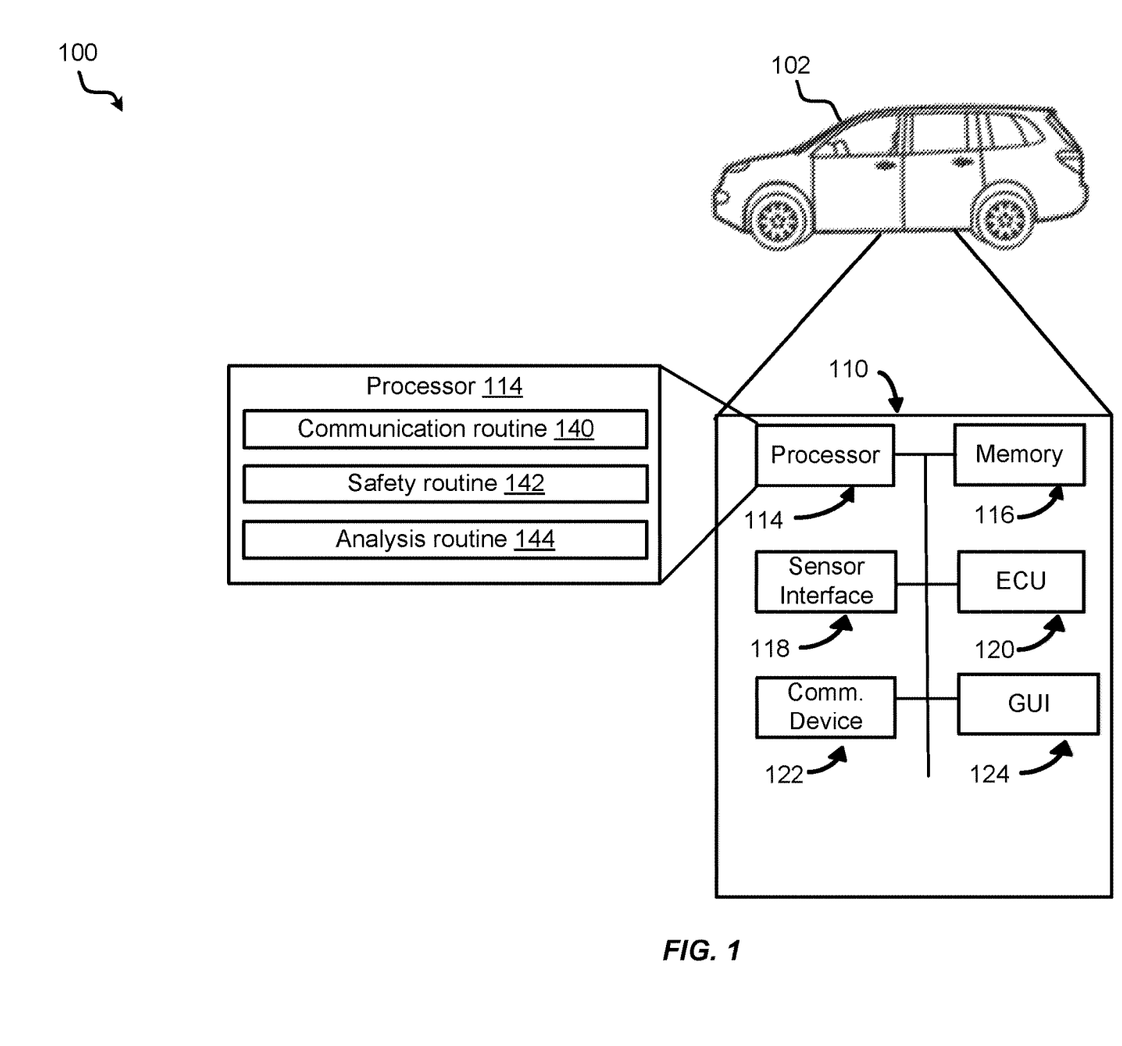
FIG. 1 illustrates a schematic view of an example operating environment of an infotainment system in accordance with aspects of the present disclosure.

Turning to FIG. 1, in some instances, a schematic view of an example of an operating environment 100 of an infotainment system 110 according to an aspect of the disclosure is provided. The infotainment system 110 may reside within a vehicle 102. The components of the infotainment system 110, as well as the components of other systems, hardware architectures, and software architectures discussed herein, may be combined, omitted or organized into various implementations. In other variations, the infotainment system 110 may include, be integrated with, or be referred to as the telematics system.

In some variations, the infotainment system 110 may include a processor 114 having a communication routine 140 that transmits and receives data via a communication device 122 (described below). The processor 114 may include a safety routine 142 that generates a safety profile of an occupant based on sensor information received from a sensor interface 118. The processor 114 may include an analysis routine 144 that analyzes the safety profile based on received safety standards. The analysis routine 144 may determine whether the safety profile adheres to the requirements of the safety standards.

In some instances, the infotainment system 110 may include a memory 116 for storing instructions for the communication routine 140, the safety routine 142, and the analysis routine 144. The processor 114 may execute the stored instructions to execute the communication routine 140, the safety routine 142, and the analysis routine 144.

In a non-limiting example, the infotainment system 110 may include a sensor interface 118 to communicate with one or more sensors (described in more detail below) in the vehicle 102. The sensor interface 118 may receive sensor data indicating, e.g., the presence of occupants, the position of a child seat (e.g., an infant seat, a rear facing seat, or a forward facing seat, etc.), and/or the tension of seat belts.

In certain aspects of the present disclosure, the vehicle 102 may generally include an electronic control unit (ECU) 120 that operably controls a plurality of vehicle systems. The vehicle systems may include, but are not limited to, the infotainment system 110, among others, including vehicle HVAC systems, vehicle audio systems, vehicle video systems, vehicle telematics system, vehicle telephone systems, vehicle control systems, and the like.

In some non-limiting examples, the vehicle 102 may further include a communications device 122 (e.g., wired or wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 122 of the vehicle 102 may be operably connected for internal computer communication via a bus (e.g., a CAN or a LIN protocol bus) to facilitate data input and output between the electronic control unit 120 and vehicle features and systems. In an aspect, the communications device 122 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

In some aspects of the present disclosure, the infotainment system 110 may include a graphical user interface (GUI) 124 that allows occupants to input data and commands, and display information to the occupants. The GUI 124 may include touchscreens, keypads, mice, speakers, microphones, displays, and/or other input/output devices.

During operation, in some variations, the communication routine 140 of the infotainment system 110 may receive occupant information indicating the number of occupants, the ages of the occupants, the weights of the occupants, and/or the heights of the occupants. The occupant information may be input by one of the occupants (e.g., the driver) via the communication device 122 (e.g., a mobile device of the occupant) and/or the GUI 124, provided by one or more sensors (described in more detail below), or recalled from memory storage among other means of providing the information.

In a non-limiting variation, the communication routine 140 of the infotainment system 110 may receive sensor information measuring safety data associated with the occupants. The sensor information may indicate whether the adult occupants are using seat belts (e.g., via a seat belt sensor), the position of the child seat chest piece (e.g., via cameras and image processing), the incline angle of the child seat (e.g., via pressure sensor to determine the weight of the infant occupant and a gyroscope to determine the incline angle), among other indications.

In a non-limiting example, the safety routine 142 of the infotainment system 110 may generate a safety profile for each of the occupants in the vehicle 102. The safety profile may include safety devices and/or configurations associated with each occupant. For example, the safety profile may include the seat belt usage, child seat harness tension, child seat chest piece position, incline angle of the child seat, orientation of the child seat, booster seat usage, or other information relevant to the safety of the occupants.

In some variations, the analysis routine 144 may analyze the safety profiles in view of the safety standards of the specific jurisdiction of the location of the vehicle (e.g., laws, regulations, rules, requirements, specifications, guidelines, and/or recommendations). The safety standards may be stored in the memory 116, and/or received via the communication device 122. For example, a jurisdiction may require all occupants of the vehicle 102 to wear seat belts. In another example, a state may require all occupants between the ages of 12-18 to wear seat belts. In yet another example, a guideline by an organization may recommend that all children shorter than 4 feet (ft) and 9 inches (in) sit in booster seats. The analysis routine 144 may analyze the safety profiles and determine whether the occupants are following the safety standards, laws, regulations, guidelines, and/or recommendations.

Figure 2:
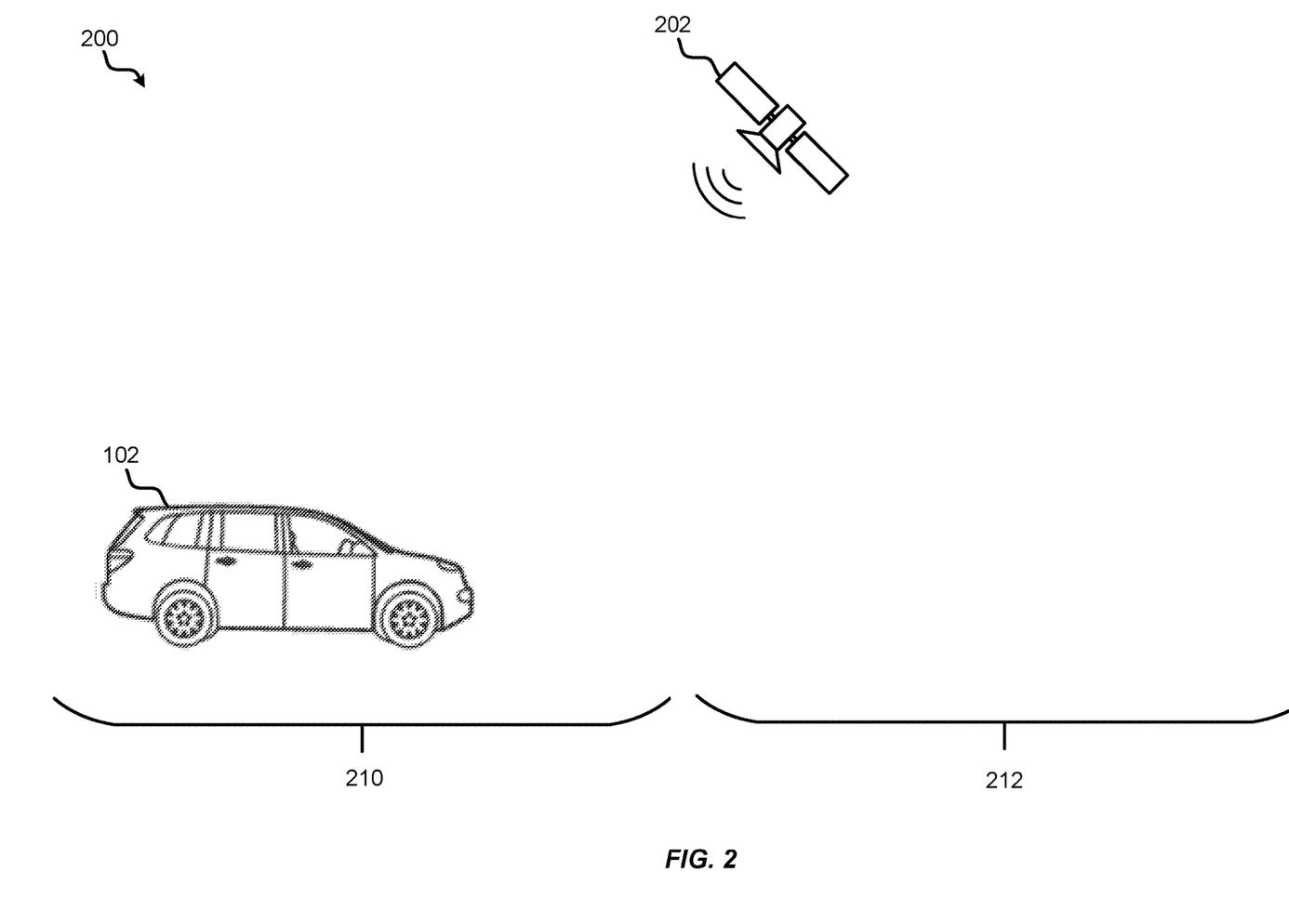
FIG. 2 illustrates an example of an environment for updating location information in accordance with aspects of the present disclosure.

Turning now to FIG. 2, and referencing FIG. 1, in some examples, an example of an environment 200 for updating location information may include the vehicle 102 driving from a first region 210 into a second region 212. The first region 210 and the second region 212 may be in different jurisdictions and have different safety laws and/or regulations. As the vehicle 102 leaves the first region 210 and enters the second region 212, the vehicle 102 may obtain location information from a satellite 202. The location information may include GPS coordinates of the vehicle 102 when the vehicle is in the second region 212. In response entering the second region 212, the analysis routine 144 may perform an updated analysis of the safety profiles in view of the updated safety laws and/or regulations (of the second region 212). For example, when the vehicle 102 is in the first region 210, an adult occupant may choose not to use the seat belt. The safety laws and/or regulations of the first region 210 may not require adult occupants to use seat belts. As the vehicle 102 enters the second region 212, the analysis routine 144 may determine that the adult occupant should use the seat belt as required by the safety laws and/or regulations of the second region 212. In response to the determination, the GUI 124 may transmit an indication (e.g., visual or audio) to indicate that the adult occupant should use the seat belt.

Figure 3:
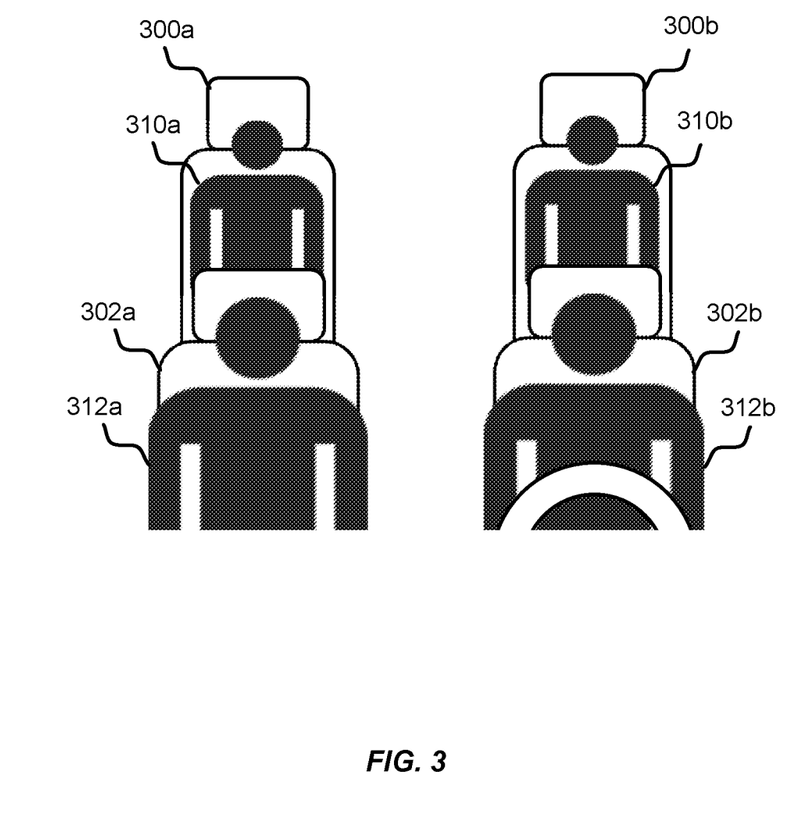
FIG. 3 illustrates an example of occupants seated in a vehicle in accordance with aspects of the present disclosure.

Turning now to FIG. 3, an example showing occupants seated in the vehicle 102 may include a first rear seat 300a and a second rear seat 300b. The vehicle 102 may include a first front seat 302a and a second front seat 302b. The occupants of the vehicle 120 may include a first rear occupant 310a and a second rear occupant 310b. The occupants of the vehicle 120 may include a first front occupant 312a and a second front occupant 312b (e.g., the driver). In one example, the communication routine 140 may receive occupant information associated with the first rear occupant 310a. The occupant information may include an age of the first rear occupant 310a (e.g., 10 years old), a weight of the first rear occupant 310a (e.g., 70 pounds (lb)), and/or a height of the first rear occupant 310a (e.g., 51 in). In one variation, some or all of the occupant information may be provided by the second front occupant 312b via the GUI 124. For example, the second front occupant 312b may input the occupant information via a touchscreen of the GUI 124 of the infotainment system 110. In another variation, some of the occupant information may be collected by the sensor interface 118 via sensors associated with the first front seat 302a (described below in more detail). In yet another variation, occupant information may be retrieved from memory storage, for example.

In another instance, the communication routine 140 may receive occupant information associated with the second rear occupant 310b, the first front occupant 312a, and the second front occupant 312b. The occupant information may include data indicating that the second rear occupant 310b is 18 months old, weighs 25 lb, and is 33 in tall. The occupant information may include data indicating that the first front occupant 312a is 30 years old, weighs 180 lb, and is 70 in tall. The occupant information may include data indicating that the second front occupant 312b is 35 years old, weighs 150 lb, and is 64 in tall.

Figure 4:
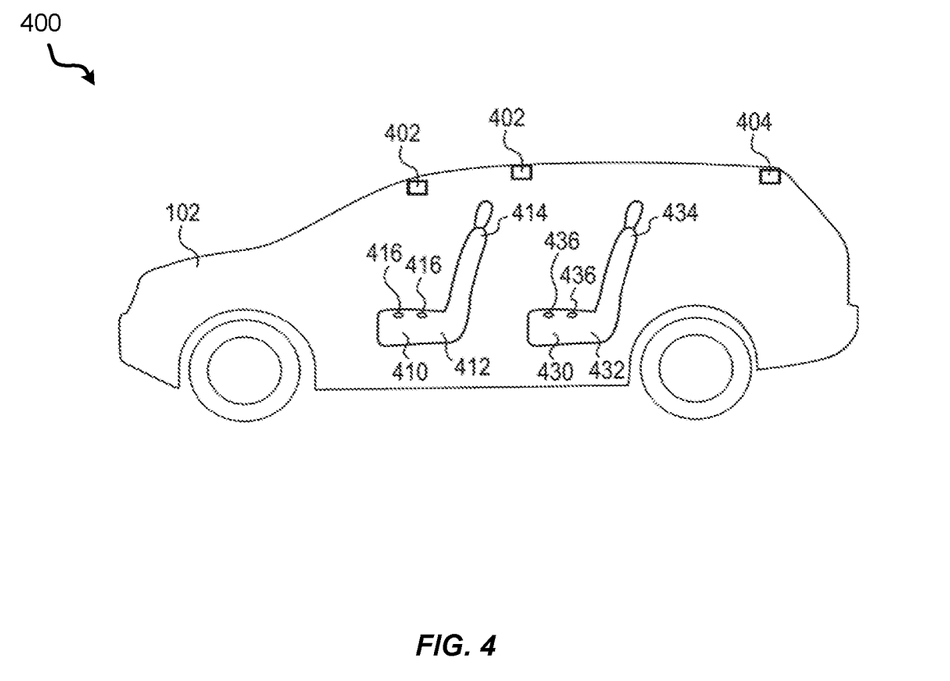
FIG. 4 illustrates an example of a schematic diagram of sensors in the vehicle in accordance with aspects of the present disclosure.

Turning to FIG. 4, and referencing FIG. 3, an example of a schematic diagram 400 of the vehicle 102 may show sensors for measuring safety data in accordance with one aspect of the present disclosure. The sensors are for illustrative purposes and fewer or more sensors may be used within the specific vehicle 102.

In one instance of the present disclosure, one or more front cameras 402 may be used to detect the proper use of the seat belts. The one or more cameras 402 may be placed on a top front portion or middle of the vehicle 102 and angled downwards. The angle of the one or more cameras 402 may be wide enough to cover the first front occupant 312a, the second front occupant 312b, the first rear occupant 310a, and/or 310b in the vehicle 102. One or more back cameras 404 may also similarly be used to detect the proper use of the seat belts. The one or more back cameras 404, in one variation, may be more effective in detecting the proper use of the seat belts of any rearward facing children. The one or more back cameras 404 may be angled downwards similar to the one or more front cameras 402. In one variation, a combination of the one or more front cameras 402 and one or more back cameras 404 may be used to detect the proper use of the seat belts. Other cameras may be used within the vehicle 102 and angled at different positions.

In one aspect of the present disclosure, during operation, the one or more back cameras 404 may capture one or more images of the second rear occupant 310b. The second rear occupant 310b may be in a child seat (described in more detail below). After the one or more back cameras 404 capturing the one or more images of the second rear occupant 310b and the restraint in the child seat, the safety routine 142 may analyze the one or more images and determine the position of the chest piece of the restraint in the child seat (e.g., whether the chest piece is below the sternum of the second rear occupant 310b). The position of the chest piece may be included in the safety profile of the second rear occupant 310b to be analyzed by the analysis routine 144. The analysis routine 144 may determine that, based on the recommendation of a safety organization (e.g., American Academy of Pediatrics), the safety profile of the second rear occupant 310b does not follow the standards provided by the safety organization (e.g., the position of the chest piece is too low). In response to the determination, the communication component 142 may display a notification via the GUI 124 to notify the second front occupant 312b (e.g., the driver) that the restraint of the second rear occupant 310b may need to be adjusted.

In other examples, the vehicle 102 may include one or more pressure sensors 416 in the bottom portion 412 of the front seats 302. The one or more pressure sensors 416 may detect the weight of the occupants in the front seats 302, such as the weight of the first front occupant 312a or the second front occupant 312b.

In certain non-limiting examples, the vehicle 102 may include one or more pressure sensors 436 in the bottom portion 432 of the back seats 300. The one or more pressure sensors 436 may detect the weight of the occupants in the back seats 300, such as the weight of the first rear occupant 310a or the second rear occupant 310b.

Fewer or more sensors 416, 436 may be placed in the vehicle 102 and are not limited to those shown above. Furthermore, some vehicles 102 may include fewer or more rows of seats where fewer or more sensors 416, 436 may be used.

Figure 5:
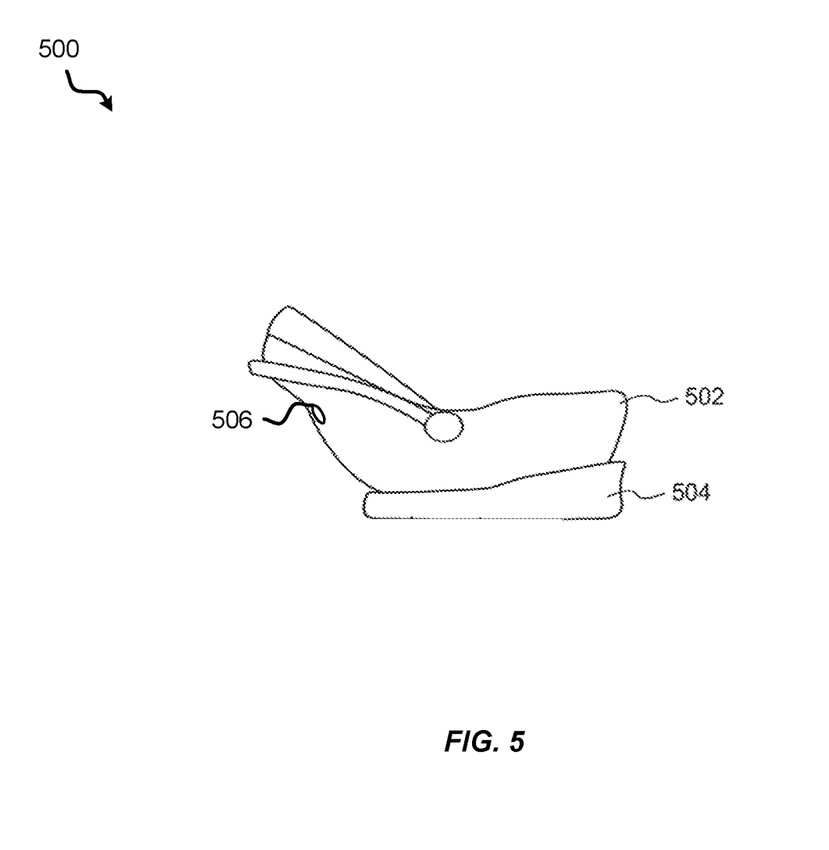
FIG. 5 illustrates an example of a schematic diagram of sensors in a carrier in accordance with aspects of the present disclosure.

Turning to FIG. 5 and referencing FIG. 3, in some instances, a schematic diagram of an illustrative carrier system 500 includes sensors in accordance with one aspect of the present disclosure. The carrier system 500 may be placed on top of the second rear seat 300b. The carrier system 500 may include a carrier 502 and a base. The carrier system 500 may be wirelessly, or through a wireline, connected to the infotainment system 110 of the vehicle 102. In one variation, the carrier system 500 may include one or more tension sensors 506 connected to the restraint (not shown) in a carrier 502. The one or more tension sensors 506 may measure the tension in the restraint.

In one aspect of the present disclosure, the communication component 140 of the infotainment system 110 may receive safety data associated with the second rear occupant 310b in the second rear seat 300b from the one or more tension sensors 506. The safety data may include the tension value associated with the restraint in the carrier 502 of the carrier system 500. The safety routine 142 may generate a safety profile associated with the second rear occupant 310b. The analysis routine 144 may analyze the safety profile to determine whether the tension in the restraint is within an acceptable range based on the safety laws and/or regulations of the specific jurisdiction.

Figure 6:
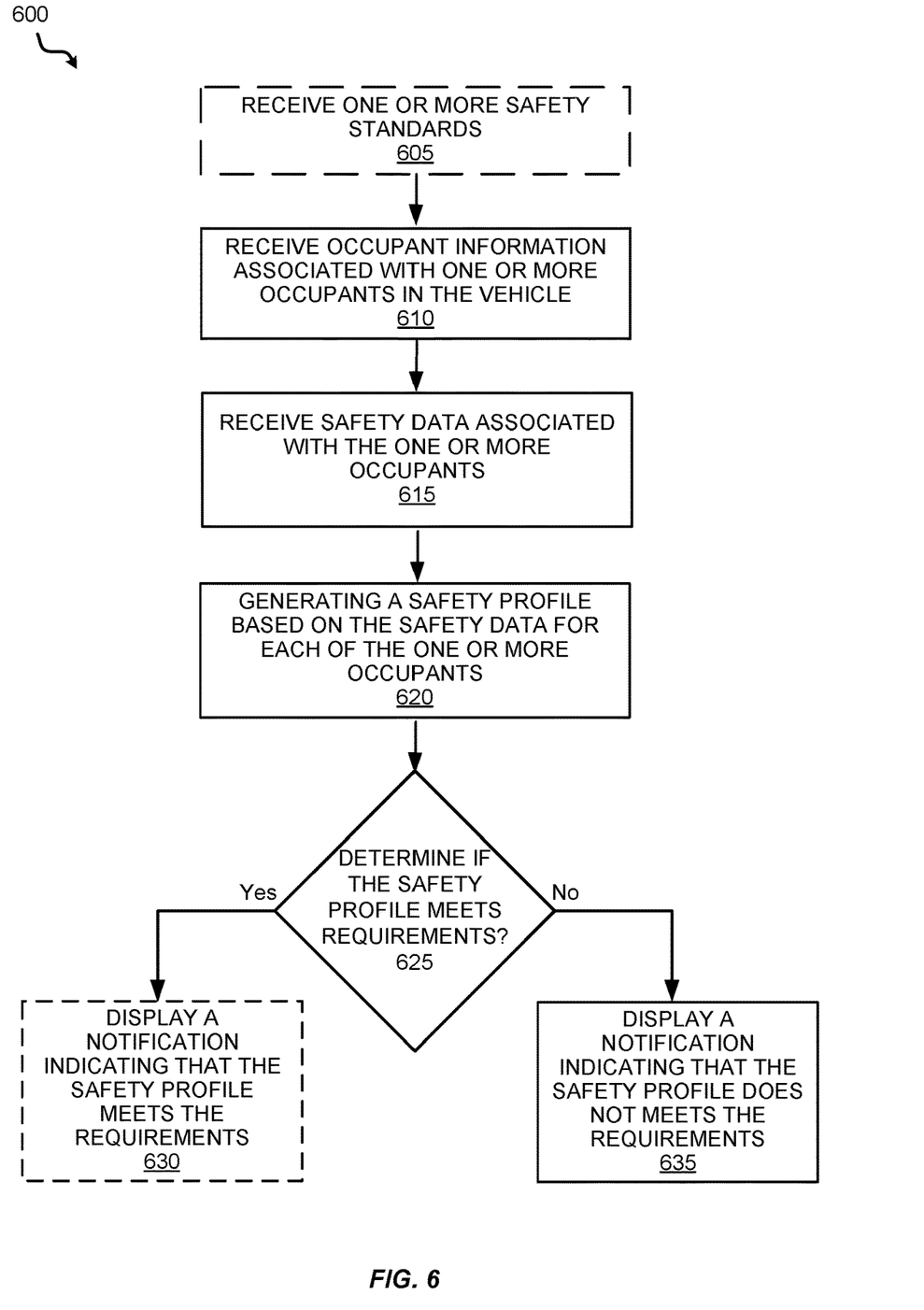
FIG. 6 illustrates an example of a method for implementing reminder in the vehicle in accordance with aspects of the present disclosure.

Turning to FIG. 6, a method 600 for implementing reminders for vehicle safety devices may be implemented by the communication routine 140, the safety routine 142, the analysis routine 144, the processor 114, the sensor interface 118, the communication device 122, and/or the infotainment system 110.

At block 605, the method 600 may optionally receive one or more safety standards. For example, the communication routine 140 of the processor 114 may receive the one or more safety standards (e.g., laws, regulations, rules, requirements, specifications, guidelines, and/or recommendations) via the communication device 122 from a remote system. The one or more safety standards may be pre-loaded into the memory 116 during the purchase of the vehicle 102.

At block 610, the method 600 may receive occupant information associated with one or more occupants in the vehicle. For example, the communication routine 140 of the processor 114 may receive occupant information from one of the occupants 310, 312 (e.g., the second front occupant 312b) via the GUI 124. Alternatively or additionally, the communication routine 140 of the processor 114 may receive the occupant information from the sensors 416, 436, 506 via the sensor interface 118, and/or occupant information may be retrieved from memory storage, among other means of providing occupant information. The occupant information may include, for example, the age, weight, height, or other physical attributes associated with at least one of the rear occupants 310 and the front occupants 312.

At block 615, the method 600 may receive safety data associated with the one or more occupants. For example, the communication routine 140 of the processor 114 may receive the safety data from the sensors 416, 436, 506 via the sensor interface 118 and/or from one of the occupants 310, 312 (e.g., the second front occupant 312b) via the GUI 124. The safety data may include information on whether the adult occupants are using seat belts (e.g., using seat belt sensor), whether the child seat chest piece is in the right position (e.g., using cameras and image processing), whether the child seat is properly reclined (e.g., using pressure sensor to determine the weight of the infant occupant and a gyroscope to determine the incline angle), etc.

At block 620, the method 600 may generate a safety profile based on the safety data for each of the one or more occupants. For example, the safety component 142 of the processor 114 may generate a safety profile based on the received safety data for each of the occupants 310, 312. Non-limiting examples of the safety profile may include information relating the seat belt usage, child seat harness tension, child seat chest piece position, incline angle of the child seat, orientation of the child seat, booster seat usage, or other information relevant to the safety of the occupants 310, 312.

At block 625, the method 600 may determine if each of the safety profile meets requirements of the one or more safety standards of the specific jurisdiction. For example, the analysis component 142 of the processor 114 may determine if each of the safety profiles meets the requirements of the one or more safety standards (e.g., American Academy of Pediatrics). In one non-limiting example, the analysis component 142 of the processor 114 may determine if the position of the child seat chest piece is too high or too low according to the American Academy of Pediatrics.

At block 630, the method 600 may optionally display a notification, in response to determining that each of the safety profile meets the requirements of the one or more safety standards, indicating that each of the safety profile meets the requirements. For example, the communication routine 140 and/or the GUI 124 may optionally display a notification that the safety profiles meet the requirements.

At block 635, the method 600 may optionally display a notification, in response to determining that at least one safety profile does not meet the requirements of the one or more safety standards, identifying the at least one of the safety profiles that does not meet the requirements. For example, the communication routine 140 and/or the GUI 124 may optionally display a notification identifying the at least one safety profile that does not meet the requirement.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. For example, the infotainment system 110 may be implemented as a computer system 700 shown in FIG. 7.

Figure 7:
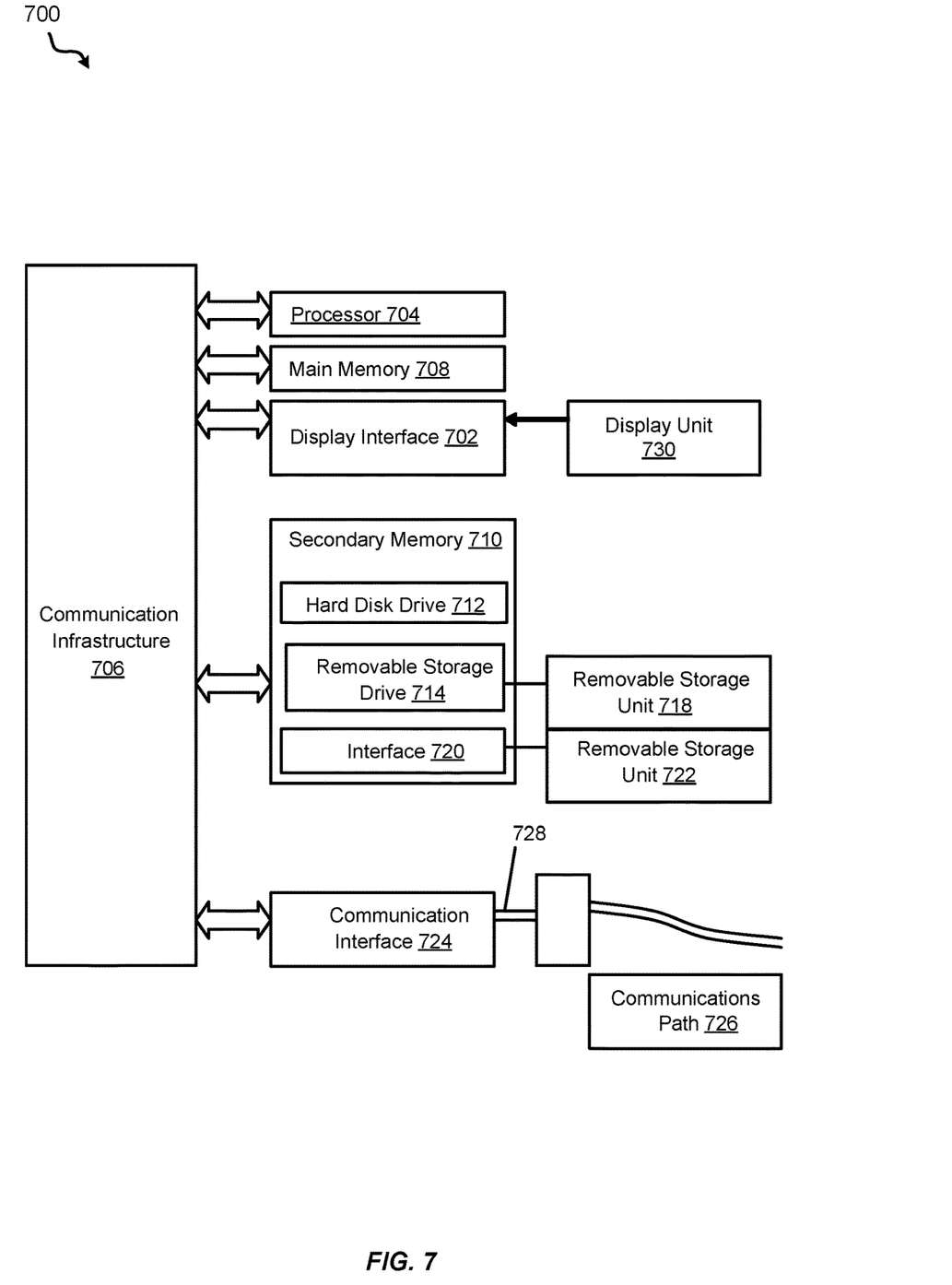
FIG. 7 illustrates an example computer system in accordance with aspects of the present disclosure.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712, and/or a removable storage drive 714, representing a floppy disk drive, a magnetic tape drive, an optical disk drive, a universal serial bus (USB) flash drive, etc. The removable storage drive 714 reads from and/or writes to a removable storage unit 718 in a well-known manner. Removable storage unit 718 represents a floppy disk, magnetic tape, optical disk, USB flash drive etc., which is read by and written to removable storage drive 714. As will be appreciated, the removable storage unit 718 includes a computer usable storage medium having stored therein computer software and/or data.

Alternative aspects of the present disclosure may include secondary memory 710 and may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 718, a hard disk installed in hard disk drive 712, and signals 728. These computer program products provide software to the computer system 700. Aspects of the present disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features in accordance with aspects of the present disclosure, as discussed herein. In particular, the computer programs, when executed, enable the processor 704 to perform the features in accordance with aspects of the present disclosure. Accordingly, such computer programs represent controllers of the computer system 700.

In an aspect of the present disclosure where the disclosure is implemented using software, the software may be stored in a computer program product and loaded into computer system 700 using removable storage drive 714, hard drive 712, or communications interface 720. The control logic (software), when executed by the processor 704, causes the processor 704 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 8:
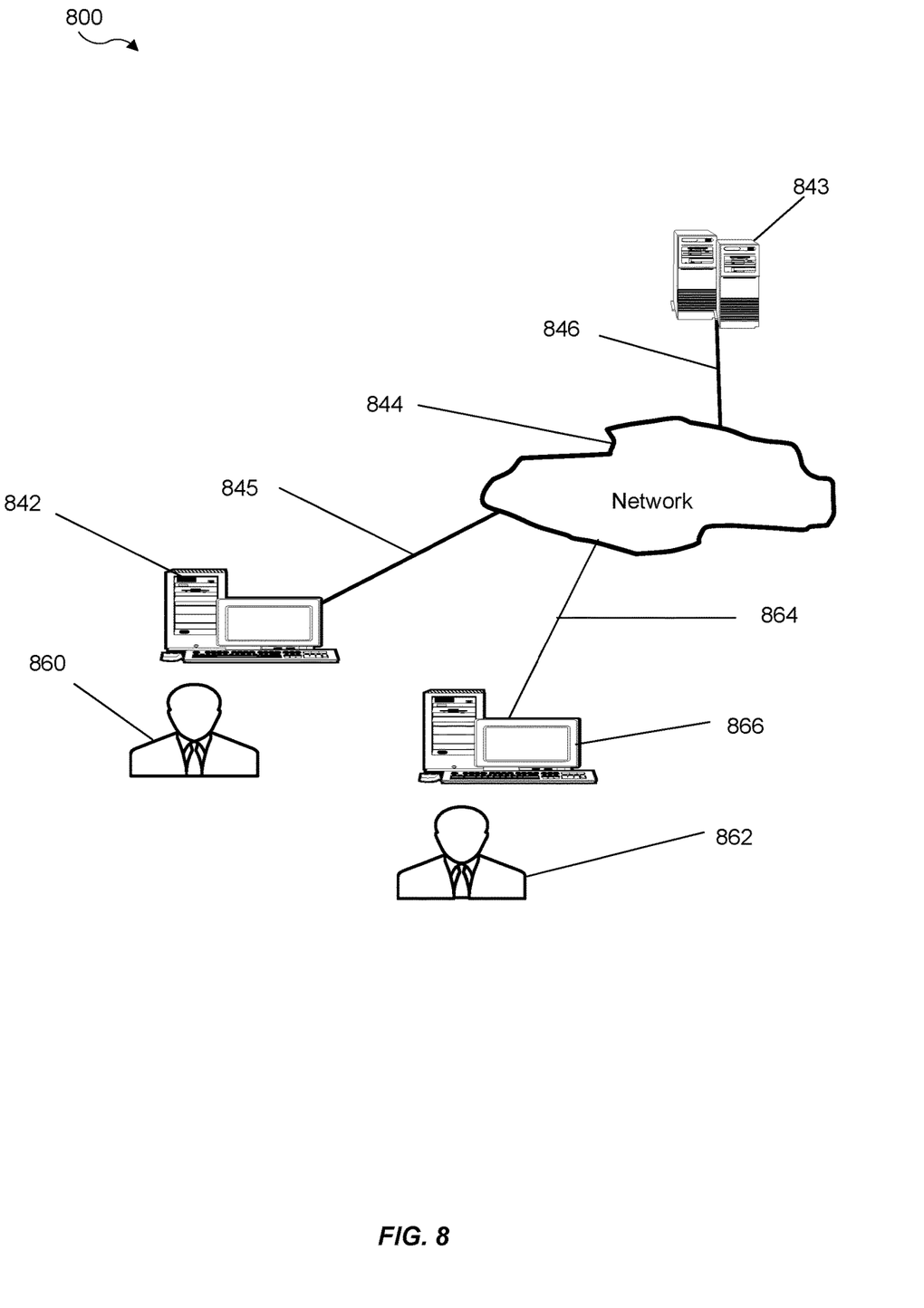
FIG. 8 illustrates a block diagram of various example system components in accordance with aspects of the present disclosure.

FIG. 8 is a block diagram of various example system components, in accordance with an aspect of the present disclosure. FIG. 8 shows a communication system 800 usable in accordance with the present disclosure. The communication system 800 includes one or more accessors 860, 862 (also referred to interchangeably herein as one or more "users") and one or more terminals 842, 866. In one aspect, data for use in accordance with aspects of the present disclosure is, for example, input and/or accessed by the one or more accessors 860, 862 via the one or more terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiberoptic links. In another example variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of implementing reminders in a vehicle, comprising:
    receiving occupant information associated with one or more occupants in the vehicle;
    receiving safety data associated with the one or more occupants;
    generating a safety profile for each of the one or more occupants;
    determining if each of the safety profiles meets requirements of one or more safety standards; and
    updating the one or more safety standards in response to the vehicle traveling from a first region to a second region.

2. The method of claim 1, further comprising receiving the one or more safety standards from a remote system.

3. The method of claim 1, further comprising displaying, in response to determining that each of the safety profiles meets the requirements, a notification indicating that the safety profiles meet the requirements.

4. The method of claim 1, further comprising displaying, in response to determining that at least one of the safety profiles does not meet the requirements, a notification identifying the at least one of the safety profiles that does not meet the requirements.

5. The method of claim 1, wherein receiving the occupant information comprises receiving occupant information via a graphical user interface or one or more sensors.

6. The method of claim 1, wherein receiving the safety data comprises receiving the safety data from one or more sensors.

7. An infotainment system of a vehicle, comprising:
a processor; and
a memory having instructions stored therein that, when executed by the processor, cause the processor to perform the steps of:
receiving occupant information associated with one or more occupants in the vehicle;
receiving safety data associated with the one or more occupants;
generating a safety profile for each of the one or more occupants;
determining if each of the safety profiles meets requirements of one or more safety standards; and
updating the one or more safety standards in response to the vehicle traveling from a first region to a second region.

8. The infotainment system of claim 7, wherein the memory further comprises instructions that, when executed by the processor, cause the processor to perform the step of receiving the one or more safety standards from a remote system.

9. The infotainment system of claim 7, wherein the memory further comprises instructions that, when executed by the processor, cause the processor to perform the step of displaying, in response to determining that each of the safety profiles meets the requirements, a notification indicating that the safety profiles meet the requirements.

10. The infotainment system of claim 7, wherein the memory further comprises instructions that, when executed by the processor, cause the processor to perform the step of displaying, in response to determining that at least one of the safety profiles does not meet the requirements, a notification identifying the at least one of the safety profiles that does not meet the requirements.

11. The infotainment system of claim 7, further comprising:
a graphical user interface; and
one or more sensors, wherein receiving the occupant information comprises receiving occupant information via the graphical user interface or the one or more sensors.

12. The infotainment system of claim 7, further comprising one or more sensors, wherein receiving the safety data comprises receiving the safety data from one or more sensors.

13. A non-transitory computer readable medium storing computer-executable instructions that, when executed by a processor of an infotainment system of a vehicle, cause the processor to perform the steps:
receiving occupant information associated with one or more occupants in the vehicle;
receiving safety data associated with the one or more occupants;
generating a safety profile for each of the one or more occupants;
determining if each of the safety profiles meets requirements of one or more safety standards; and
updating the one or more safety standards in response to the vehicle traveling from a first region to a second region.

14. The non-transitory computer readable medium of claim 13, further comprising instructions that, when executed by the processor, cause the processor to perform the step of displaying, in response to determining that each of the safety profiles meets the requirements, a notification indicating that the safety profiles meet the requirements.

15. The non-transitory computer readable medium of claim 13, further comprising instructions that, when executed by the processor, cause the processor to perform the step of displaying, in response to determining that at least one of the safety profiles does not meet the requirements, a notification identifying the at least one of the safety profiles that does not meet the requirements.

16. The non-transitory computer readable medium of claim 13, wherein the instructions for receiving the occupant information comprises instructions that, when executed by the processor, cause the processor to perform the step of receiving occupant information via the graphical user interface or the one or more sensors.

17. The non-transitory computer readable medium of claim 13, wherein the instructions for receiving the safety data comprises instructions that, when executed by the processor, cause the processor to perform the step of receiving the safety data from one or more sensors.

* * * * *